US006929086B1

(12) United States Patent
Husain et al.

(10) Patent No.: US 6,929,086 B1
(45) Date of Patent: Aug. 16, 2005

(54) MOTOR VEHICLE STEERING SYSTEM

(75) Inventors: Muqtada Husain, Brownstown, MI (US); Brian E. Daugherty, Ann Arbor, MI (US); John G. Oynoian, Taylor, MI (US)

(73) Assignee: Visteon Global Technologies, Inc., Van Buren Township, MI (US)

( * ) Notice: Subject to any disclaimer, the term of this patent is extended or adjusted under 35 U.S.C. 154(b) by 84 days.

(21) Appl. No.: 10/782,453

(22) Filed: Feb. 18, 2004

(51) Int. Cl.$^7$ .............................................. B62D 5/00
(52) U.S. Cl. ......................... 180/413; 180/402; 701/43
(58) Field of Search ................................ 180/413, 416, 180/410, 408, 402; 701/43

(56) References Cited

U.S. PATENT DOCUMENTS

| | | | |
|---|---|---|---|
| 4,741,409 A | 5/1988 | Westercamp et al. | |
| 4,771,846 A | 9/1988 | Venable et al. | |
| 4,823,899 A | 4/1989 | Ron | |
| 4,970,647 A | 11/1990 | Karadsheh et al. | |
| 5,014,802 A | 5/1991 | Knoll et al. | |
| 5,076,382 A | 12/1991 | Vaughn et al. | |
| 5,097,917 A | 3/1992 | Serizawa et al. | |
| 5,224,042 A | 6/1993 | Morrison | |
| 5,257,191 A * | 10/1993 | Takehara et al. | ............. 701/43 |
| 5,258,912 A | 11/1993 | Ghoneim et al. | |
| 5,653,304 A | 8/1997 | Renfroe | |
| 5,908,457 A | 6/1999 | Higashira et al. | |
| 5,964,814 A | 10/1999 | Müller et al. | |
| 6,012,540 A | 1/2000 | Bohner et al. | |
| 6,032,757 A | 3/2000 | Kawaguchi et al. | |
| 6,041,882 A | 3/2000 | Bohner et al. | |
| 6,269,903 B1 | 8/2001 | Bohner et al. | |
| 6,283,243 B1 * | 9/2001 | Bohner et al. | ............. 180/406 |
| 6,341,251 B1 | 1/2002 | Enomoto et al. | |
| 6,370,460 B1 | 4/2002 | Kaufmann et al. | |
| 6,442,462 B1 | 8/2002 | Nishizaki et al. | |
| 6,523,632 B1 | 2/2003 | Hanaoka et al. | |

(Continued)

OTHER PUBLICATIONS

International Publication No. WO 99/38390, Inventor: Borsting et al., Published on Nov. 18, 1999, entitled: Steering Arrangement.

(Continued)

*Primary Examiner*—Tony Winner
(74) *Attorney, Agent, or Firm*—Brinks Hofer Gilson & Lione

(57) ABSTRACT

A steering system selectively operable in one of six modes: steer-by-wire with rear steering, steer-by-wire without rear steering, electronic power assist steering (EPAS) with rear steering, electronic power steering (EPAS) without rear steering, mechanical backup manual steering with rear steering, and mechanical backup manual steering without rear steering. The steer-by-wire system includes a driver interface system (DIS), a front road wheel actuator system (FRWAS), a rear road wheel actuator system (RRWAS), and a controller for monitoring and implementing the preferred control strategy. The steering system operates normally in a steer-by-wire mode. In each of the EPAS mode and manual mode, the controller causes a clutch mechanism to engage, thus creating a mechanical linkage between the steerable member and the rack and pinion system while maintaining rear wheel assisted steering. In the EPAS mode, one of the front road wheel actuator or the reaction torque generator is available to assist in the steering operation along with rear wheel steering. Alternatively, in the manual mode, both the DIS and the FRWAS are deactivated and the vehicle is steerable through mechanical device along with the rear wheel assisted steering.

40 Claims, 12 Drawing Sheets

U.S. PATENT DOCUMENTS

| | | |
|---|---|---|
| 6,529,803 B2 | 3/2003 | Meyers et al. |
| 6,580,989 B1 | 6/2003 | Husain et al. |
| 6,625,529 B2 | 9/2003 | Obata et al. |
| 6,681,167 B2 | 1/2004 | Bedner et al. |
| 2004/0144592 A1 * | 7/2004 | Andonian et al. .......... 180/402 |

OTHER PUBLICATIONS

International Publication No. WO 99/39967, Inventor: Bohner et al., Published on Aug. 12, 1999, entitled: Steering System.

* cited by examiner

MOTOR VEHICLE STEERING SYSTEM

BACKGROUND OF THE INVENTION

1. Technical Field of the Invention

The present invention relates to a steering apparatus for a vehicle that directs front and rear steerable wheels in response to operator input in which the steerable wheels are not mechanically coupled to a manually steerable member.

2. Description of the Prior Art

A typical automotive vehicle is steered by transmitting operations of a manually steerable member, such as a steering wheel, to a steering mechanism for directing steerable wheels for steering. Generally, the manually steerable member is located inside the vehicle passenger compartment, and the steerable wheels are located at the front and rear of the vehicle. Thus, a suitable steering mechanism is necessary to couple the manually steerable member and the front and rear steerable wheels.

A representative steering mechanism is a rack-and-pinion type steering mechanism. In a rack-and-pinion steering mechanism, the rotational motion of the steering wheel is communicated through a steering column to a pinion gear at its distal end. The pinion gear is engaged with a rack gear disposed laterally between the steerable wheels, which in turn are coupled to the rack gear by knuckle arms and tie rods. In this manner, rotation of the steering wheel is translated into the lateral movement of the rack gear, which causes the steerable wheels to pivot in the desired direction. In general, mechanical steering mechanisms are power-assisted by hydraulic or electrical assist units.

In order to overcome limitations presented by mechanical steering systems, it has been proposed to utilize a steering system in which the manually steerable member is not mechanically coupled to the steerable wheels and steering movement is achieved by an electrically controlled motor, a steer-by-wire system. In a steer-by-wire system, a road wheel actuator operates in response to detected values of various steering parameters, such as for example steering wheel angle, vehicle speed, vehicle lateral acceleration, and road wheel angle. The detected values are communicated electronically to the road wheel actuator from sensors, or alternatively, from a centralized controller. Upon receipt and processing of the steering command, the road wheel actuator orients the steerable wheels in the desired direction in accordance with the vehicle steering parameters.

In order to provide a steering "feel" to the vehicle operator, a typical steer-by-wire vehicle will also utilize a reaction torque generator that synthesizes and generates a reaction torque in the manually steerable member. For example, if the manually steerable member is a steering wheel, then the reaction torque generator will generally rotate a shaft coupled to the steering wheel in order to give the vehicle operator a resistive or assisting torque. In general, the magnitude and direction of the reaction torque will be determined by a control system cooperating between the reaction torque generator, the road wheel actuator, and the various vehicle sensing systems.

The adaptability of steer-by-wire systems to myriad situations provides a great number of advantages not apparent in a mechanically steered vehicle. It is believed that a hybrid-type steering system is needed in order to ease the transition in the automotive market from mechanically coupled steering systems to steer-by-wire steering systems.

Moreover, rear wheel steering is becoming more and more common on vehicles. Front and Rear wheel steering provides increased vehicle maneuverability relative to front wheel steering only vehicles. Vehicle front and rear wheel steering offers advantages over vehicles having only front wheel steering. However, manufacturers have been challenged in implementing rear wheel steering with other vehicle features.

BRIEF SUMMARY OF THE INVENTION

Accordingly, the present invention comprises a steering system selectively operable in one of six modes: steer-by-wire with rear steering, steer-by-wire without rear steering, electronic power assist steering (EPAS) with rear steering, electronic power steering (EPAS) without rear steering, front steering mechanical backup (manual steering) with rear steering, and front steering mechanical backup without rear steering. This steer-by-wire system includes a driver interface system (DIS), a front road wheel actuator system (FRWAS), a rear road wheel actuator system (RRWAS), and first and second controllers for monitoring and implementing the preferred control strategy.

The DIS includes a steerable member that is rotatable about a shaft. The rotation of the steerable member and the shaft is measured by a steering wheel angle sensor, disposed about the shaft. The shaft is coupled to a reaction torque generator for generating a steering feel based upon the applicable steering parameters, such as the vehicle speed, steering wheel angle, yaw rate, rack load, and lateral acceleration.

The FRWAS includes a front road wheel actuator responsive to control commands from the first controller. The front road wheel actuator is operatively coupled to a rack and pinion type steering system. Through the first controller, the front road wheel actuator rotates the pinion gear, which in turn causes the lateral motion of the rack gear thereby steering the road wheels. Like the DIS, the performance of the FRWAS is monitored by a plurality of sensors.

The RRWAS includes left and right rear road wheel actuators responsive to control commands from the second controller. The rear road wheel actuators are operatively coupled to the left and right road wheels, respectively. Through the second controller, each of the rear road wheel actuators rotates its respective wheel to steering the rear road wheels. Like the DIS, the performance of the RRWAS is monitored by a plurality of sensors.

Further aspects, features and advantages of the invention will become apparent from consideration of the following description and the appended claims when taken in connection with the accompanying drawings

DETAILED DESCRIPTION OF THE INVENTION

In a preferred embodiment, the present invention generally comprises a steering system selectively operable in one of six modes: steer-by-wire with rear steering, steer-by-wire without rear steering, electronic power assist steering (EPAS) with rear steering, electronic power steering (EPAS) without rear steering, front steering mechanical backup (manual steering) with rear steering, and front steering mechanical backup without rear steer-by-wire control. In a preferred embodiment, the steer-by-wire system includes a driver interface system (DIS), a front road wheel actuator system (FRWAS), a rear road wheel actuator system (RRWAS), and first and second controllers for monitoring and implementing the preferred control strategy.

In the preferred embodiment, the steering system operates normally in a steer-by-wire mode with rear steering, in which information regarding the angular position of the steerable member is combined with other data to compute a control or command signal, which the controller directs to the front and rear road wheel actuators. As noted, the front and rear road wheel actuators then cooperate to rotate the front and rear road wheels, respectively. The FRWAS mechanically steers the front road wheels through the rack and pinion mechanism. Moreover, the steering system is also adapted for operation in steer-by-wire mode without rear steering, an electronic power assist steering (EPAS) mode (with and without rear steering) and a manual backup mode (with and without rear steering) in response to a malfunction in any part component of the FRWAS, DIS or RRWAS subsystem.

In the EPAS mode and backup mode, the controller causes a clutch mechanism to engage, thus creating a mechanical linkage between the steerable member and the rack and pinion system. In the EPAS mode, one of the front road wheel actuator or the reaction torque generator is available to assist in the steering operation. Additionally, the rear road wheel actuator continues to receive control signals from the controller and rotate the rear road wheels accordingly. Alternatively, in the backup mode, both the DIS and the FRWAS are deactivated and the front road wheels of the vehicle are steerable through entirely mechanical means. However, the RRWAS may still be operable. In the event that the system power is cut off or the vehicle is not running, i.e., both FRWAS and RRWAS are inoperable, the steering system of the present invention is operable in the manual mode.

Figure 1:
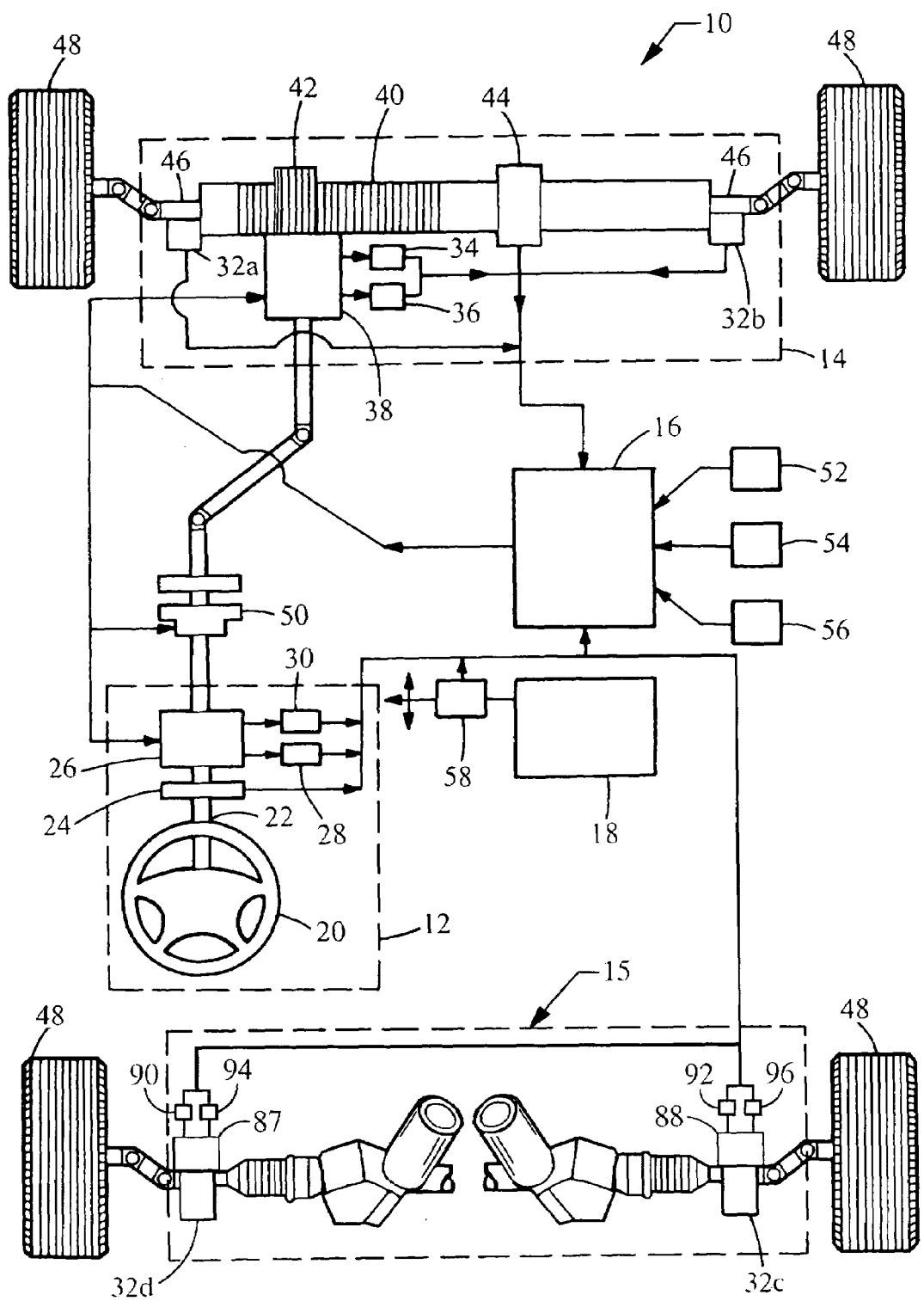
FIG. 1 is a general schematic diagram of a steering system in accordance with one embodiment of the present invention.

In accordance with one embodiment of the present invention, FIG. 1 depicts a schematic block diagram of a steering system 10 having a front steering system and a rear steering system. The steer-by-wire system 10 includes as its primary components a driver interface system (DIS) 12, a front road wheel actuator system (FRWAS) 14, a rear road wheel actuator system 15, and front and rear controller 16 for monitoring and controlling the respective systems. The control architecture of the steering system 10 of the present invention is based upon the operational independence of the DIS 12, the FRWAS 14, and the RRWAS 15. The steering system 10 is powered by a battery 18, which provides electrical power to the various electrical components herein.

The DIS 12 includes a steerable member 20 that is rotatable about a shaft 22. The shaft 22 extends from the steerable member 20 towards the FRWAS 14. Between the shaft 22 and the FRWAS 14 is a clutch mechanism 50, the control of which is discussed further herein. The rotation of the steerable member 20 and the shaft 22 is measured by a steering wheel angle sensor 24, disposed about the shaft 22. In a preferred embodiment, the steering wheel angle sensor 24 as shown includes at least one independent sensing unit, such that measurement redundancy is ensured. The shaft 22 is coupled to a reaction torque generator 26, the operation of which is controlled by the controller 16.

The reaction torque generator 26 generates a prescribed torque upon the shaft 22, thus providing either resistance or assistance to a vehicle operator in rotating the steerable member 20. The performance of the reaction torque generator 26 is monitored by a pair of condition sensors 28, 30. A reaction torque generator current sensor 28 measures the amount of current utilized by the reaction torque generator, and conveys that measurement to the controller 16. Similarly, a reaction torque generator temperature sensor 30 monitors the temperature of the reaction torque generator 26 and communicates measurements to the controller 16. The foregoing sensors and other sensors associated with the DIS 12 may be referred to herein as the "steering sensors".

The FRWAS 14 includes a front road wheel actuator 38 responsive to control commands from the controller 16. The front road wheel actuator 38 is operatively coupled to a pinion gear 42, which is in turn engaged to a rack gear 40 displaced about a transverse axis of the motor vehicle. The rack gear 40 is coupled to or part of an axle 46, which extends laterally across the motor vehicle to a location suitable for the road wheels 48. Through the controller 16, the front road wheel actuator 38 rotates the pinion gear 42, which in turn causes the lateral motion of the rack gear 40, and through a typical steering and suspension system, the pivoting and steering of the road wheels 48.

The performance of the FRWAS 14 is monitored by a plurality of sensors. Road wheel position sensors 32a, 32b, are adapted for measuring or estimating the angular position of the road wheels 48 and communicating this value to the controller 16. During steering operation, a rack load sensor 44 measures the load on the rack gear 40, a value that is also transmitted to the controller 16. The operating conditions of the front road wheel actuator 38 are monitored by a front road wheel actuator temperature sensor 36 and a front road wheel actuator current sensor 34. The foregoing sensors and other sensors associated with the FRWAS 14 may be referred to herein as the "front road wheel sensors".

The steering system 10 includes additional components, including a yaw rate sensor 52, a lateral acceleration sensor 54, and a vehicle speed sensor 56. The foregoing sensors are directed primarily at the measurement or estimation of vehicle parameters, and are thus utilized primarily for maximizing the system's steering performance. Additionally, a battery current sensor 58 detects the electrical current available to the steering system 10, and conveys this value to the controller 16.

The RRWAS 15 includes a rear road wheel actuators 87 and 88 responsive to control commands from the controller 16 for rear steering. The rear road wheel actuators 87 and 88 are operatively coupled to rear road wheel position sensors 32c and 32d, respectively. RRWA 87 and 88 are configured to move each respective rear wheel 48 based on the command signal from the controller 16. RRWA 87 and 88 may each be any suitable actuator or actuator assembly known in the art used for angularly moving or pivoting road wheels.

The performance of the RRWAS 15 is monitored by a plurality of sensors. Rear road wheel position sensors 32c, 32d, are adapted for measuring or estimating the angular position of the road wheels 48 and communicating this value to the controller 16. The operating conditions of the rear road wheel actuators 87 and 88 are monitored by a rear road wheel actuator temperature sensors 90, 92 and a rear road wheel actuator current sensor 94, 96. The foregoing sensors and other sensors associated with the RRWAS 15 may be referred to herein as the "rear road wheel sensors".

Figure 2A:
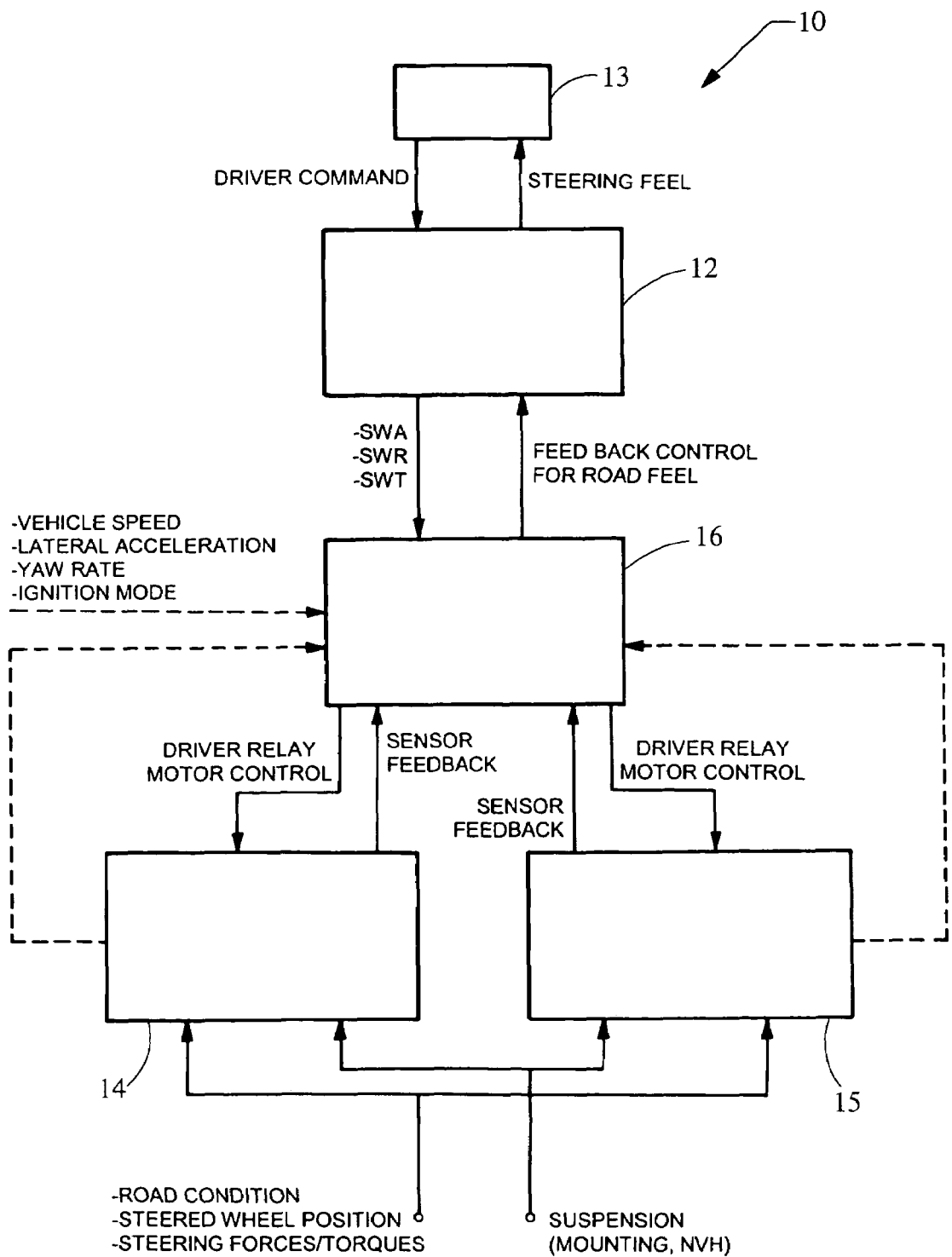
FIG. 2a is a block diagram of the steering system control strategy in accordance with one embodiment of the present invention.

FIG. 2a illustrates a high-level block diagram 10 of a control strategy for steering system 10 in accordance with one embodiment of the present invention. In this embodiment, a controller system 16 processes a driver's intent (indicated by reference numeral 13) which is represented by a steering wheel angle signal indicative of steering wheel angle, a steering wheel rate signal indicative of steering wheel rate, and a steering wheel torque signal indicative of steering wheel torque from DIS 12. Other signal may be implemented in this embodiment. The driver's intent is received by the controller system 16 via Driver Interface System 12. The controller system 16 processes the signals and then sends command signals to the front and rear road wheel actuators 14 and 15 which affect motion to each of the steered wheels.

Also the controller system 16 processes other signals including signals of the road wheel angle(s), road wheel motor(s) current, yaw rate, lateral acceleration and vehicle speed to determine the vehicle's dynamic status. It is to be noted that some or all of the signals of the road wheel angle(s), road wheel motor(s) current, yaw rate, lateral acceleration and vehicle speed may be received from the FRWAS 14 and RRWAS 15.

By means of the FRWAS 14 and RRWAS 15, the controller system 16 will issue commands to control the road wheels based on the driver's intent 13 and the vehicle dynamic status. By means of DIS 12, the controller will issue commands to control the steering wheel feedback based on the driver's intent, the vehicle dynamics status and pre-specified parameter settings such as an adjustable steering ratio, a maximum steering effort/torque, and a desired feel.

The front road wheel actuator system (FRWAS) 14 is configured to receive command signals from the controller system 16 and converts the command signals to a steered wheel motion. In this embodiment, this may include a mechanism that connects both the front steered wheel by means of tie rods to a rack and pinion device, where an electric motor imparts the rotary motion to the pinion, which in turn moves the rack. The rotary motion to the pinion may be determined by the controller system based on various factors, including but not limited to steering wheel angle, steering wheel rate, vehicle speed, lateral acceleration, yaw rate, road condition, environmental condition.

In this embodiment, rear road wheel actuator system (RRWAS) 15 comprises two independent electric actuators. In a preferred embodiment, the independent rear actuators are Electric Rack and Pinion type actuators. However, it is to be understood that any other type of electric actuators may be used, including but not limited to ball screw actuators.

RRWAS 15 has sensors to sense steered wheel angles, motor current sensor for the motors which drives the actuators, temperature sensor to record the temperature, and force/torque sensor to record the tie road load/wheel alignment moment.

In this embodiment, after receiving command signals from the controller system 16, the FRWAS 14 and the RRWAS 15 respond accordingly based on the command signals and sensor feedback signals are sent back to the controller system 16. For example, the FRWAS 14 may move the front steering wheels to the left at a particular angle from center based on the predetermined steering ratio of the vehicle. Moreover, other vehicle signals including motor current signal, temperature signal, steered wheel angle signal, road/steering forces signal from the road wheel actuator systems 14 and 15 may be fed to the controller system 16.

After receiving the feedback signals, the controller system 16 may then process the feedback signals to generate a steering feel feedback signal to the DIS 12. The DIS 12 may include a steering feedback actuator, a motor, a brake, and a damper (not shown). The steering feel feedback signal from the controller system 16 closes the loop for the steering system 10 in which the driver's intent results in steered wheels and generated steering feel fed back to the driver.

Referring to FIGS. 1 and 2a, the steering system 10 is capable of including features such as driver selectable feel, speed sensitive steering feel, actively controlled variable ratio, end-of-rack travel feedback, curb feel, active returnability, enhanced low speed maneuverability, drastic reduction in turning radius and interactive vehicle dynamics control and a failsafe column backup.

In normal use, when all the subsystems are functioning properly, the steering system may have three normal modes of operation. In a first mode, when the vehicle is traveling at a low rate of speed, the rear wheels turn in the opposite direction of the front wheels. The first mode may be used for parking situations or trailer towing and allows for a higher degree of vehicle maneuverability. The first mode also reduces the turning radius of the vehicle. In a second mode, the vehicle may be operated at moderate speeds. In the second mode, the rear wheels are independently controlled to optimize turning of the vehicle. In a third mode, when the vehicle is moving at a high rate of speed, the vehicle wheels turn in the same direction as the front wheels. The third mode allows a reduction of vehicle yaw or rotation motion during passing, lane change, or evasive maneuvers. The third mode allows stability of the vehicle when towing a trailer.

The rear steer-by-wire system can also be used to assist the driver if a fault occurs in the front steering system. If the front system experiences a fault and the rear steer-by-wire system is still able to function, then the mechanical backup clutch will engage, thereby placing the system into a manual steering mode. However, the rear wheels may be controlled to assist the driver and provide greater maneuverability of the vehicle.

Referring to FIGS. 1 and 2a, the steering system 10 operates normally in a steer-by-wire mode, in which information regarding the angular position of the steerable member 20 is combined with other pertinent information to compute a control signal, which the controller 16 directs to the front road wheel actuator 38 and the rear road wheel actuators 87 and 88. As noted, the front road wheel actuator 38 then mechanically steers the front road wheels 48 through the rack and pinion mechanism of the FRWAS 14 and the rear road wheel actuators 87, 88 mechanically steer the rear road wheels 48 by known actuation means.

However, the steering system 10 is also adapted for operation in an electronic power assist steering (EPAS) mode (with and without rear steering) and a manual mode (with and without rear steering). Operation in these alternate modes is determined by the controller 16 in response to a malfunction in any part of either the FRWAS 14, DIS 12 or the RRWAS 15. If the battery 18 is unable to supply sufficient electrical current or if the steering system 10 of the present invention is powered down, then the lack of electrical power causes the clutch mechanism 50 to engage.

In each of the EPAS mode and manual mode, the controller 16 causes the clutch mechanism 50 to engage, thus connecting the shaft 22 to the pinion gear 42. One of the front road wheel actuator 38 or the reaction torque generator 26 is available to assist the rotation of the shaft 22 and the pinion gear 42 in the EPAS mode. Moreover, if the controller 16 is operational, the rear road wheels 48 may be controlled by the controller 16 and rear road wheel actuators 87,88 for further assisted steering.

In the manual mode, both front road wheel actuator 38 and the reaction torque generator 26 are deactivated, and rotation of the pinion gear 42 is accomplished solely by manual rotation of the shaft 22. So long as the controller 16 is operational, the rear road wheel actuators 87,88 may continue to move the rear road wheels 48 for further assisted steering. Moreover, it is to be understood that the steering system may include separate controllers for each of the road wheel actuators.

As an example of a control strategy for the steering system 10 above, a control scheme for the steer-by-wire mode, EPAS mode, and manual mode is provided below with reference to FIGS. 2b–10.

Figure 2B:
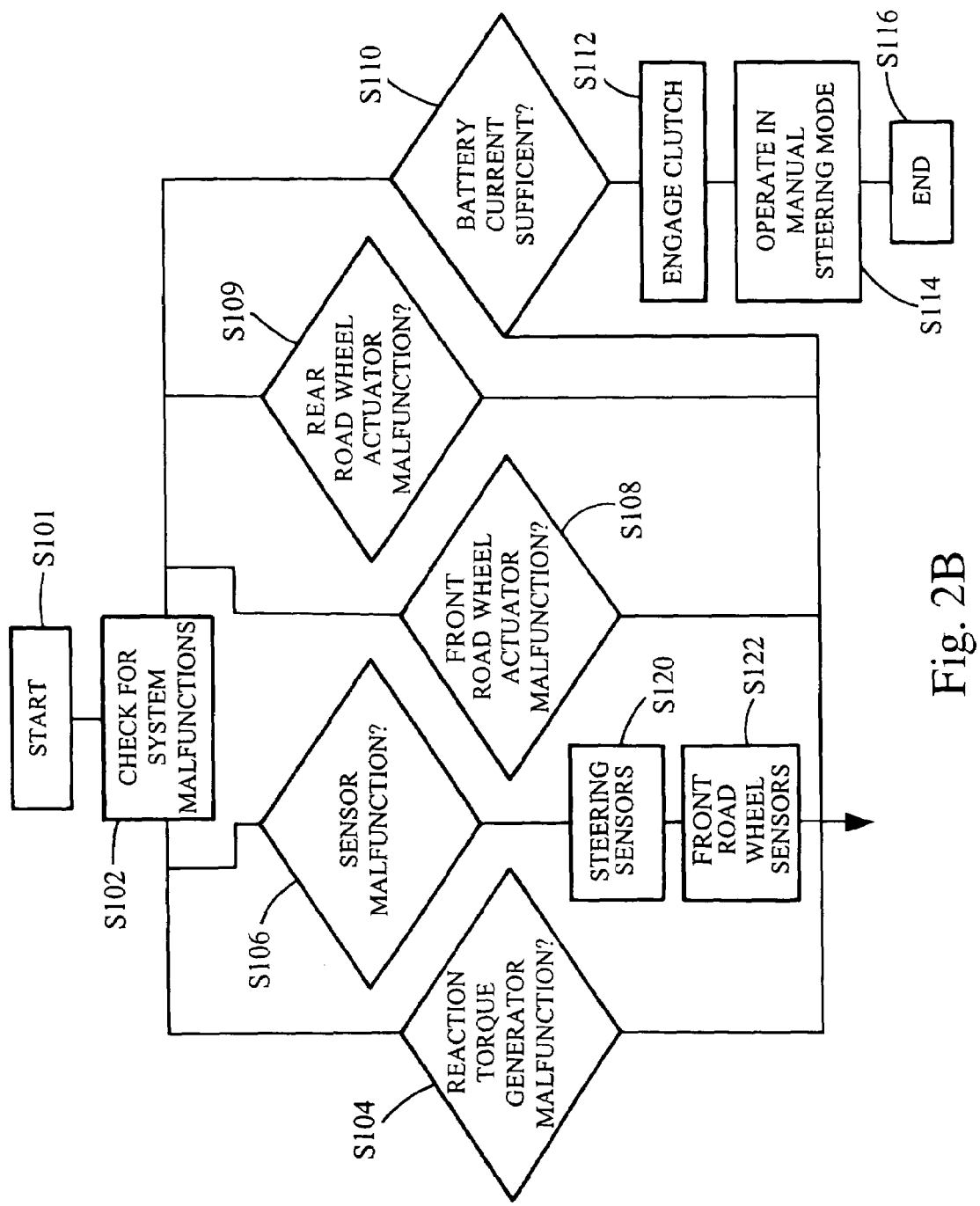
FIG. 2b is a flow chart depicting the top-level controls of the steering system for a front and rear road wheel actuator system.
Figure 2C:
FIG. 2c is a decision matrix for system controls of the front and rear road wheel actuator system.

FIGS. 2b–2c depict a decision matrix and a high-level flowchart for the diagnosis and remedy of malfunctions in the steering system 10 of the present invention. The flowchart begins with step S101 and step S102, in which the controller 16 checks for system malfunctions. Due to the complexity of the steering system 10, the controller 16 checks for system malfunctions in four dependent domains: the reaction torque generator in step S104, the sensors in step S106, the front road wheel actuator in step 108 and the rear road wheel actuator in step S109. With respect to the sensors, the controller 16 inquires as to the functional state of the steering sensors in step S120 and the front road wheel sensor in step S122. Because the DIS 12 and the FRWAS 14 are comprised of the foregoing actuators and sensors, a more detailed cross-comparison analysis is implemented.

The functional interdependence of steps S104, S120, S122, S108 and S109 is demonstrated clearly in matrix M1. Although any one malfunction is sufficient for the controller 16 to engage the clutch mechanism 50, it is necessary for the controller 16 to further inquire as to the state of other dependent and independent subsystems. For example, a malfunction of the steering wheel angle sensor 24 alone will render the entire DIS 12 inoperable, and thus the clutch mechanism 50 will be engaged. A second malfunction of the reaction torque generator 26 will also render the DIS 12 inoperable, but the controller 16 is not required to take any further mitigating action. In contrast, a third malfunction of the rack load sensor 44 will render the FRWAS 14 inoperable, and thus the controller 16 must prepare the steering system 10 for operation in a manual mode.

Consequently, each of the reaction torque generator, front road wheel actuator, rear road wheel actuators, steering sensors, and front road wheel sensors' respective conditions are used to implement a control strategy. Matrix M1 presents a tabled listing of the possible outcomes of malfunction inquires into these respective domains. For example, submatrix A1 shows the interdependence between the reaction torque generator and the front road wheel actuator, resulting in four possible combinatorial outcomes: Y/Y, Y/N, N/Y, and N/N. Similarly, submatricies A2, A3, B2, B3, C1, C2, and C3 show the combinatorial outcomes of the inquiries into the respective domains, as detailed in FIGS. 3–10.

Before proceeding to a detailed discussion of the interdependence of the DIS 12, FRWAS 14 and RRWAS 15, as shown in FIG. 2b, in step S110 the controller 16 inquires as to the sufficiency of the battery current. The battery 18 is independent from the other systems, and thus any insufficiency of battery current will result in the mechanical clutch being engaged as shown in step S112. Without sufficient electrical current, the controller 16 does not have an available EPAS mode in which to operate, and thus the steering system 10 must be operated in a pure manual mode as shown in step S114 without rear wheel steering. The controller 16 then resumes the normal monitoring and control of the steering system 10 in step S116. If the battery current is sufficient, then the controller 16 proceeds to matrix M1, which is followed by the relevant submatricies.

Figure 3:
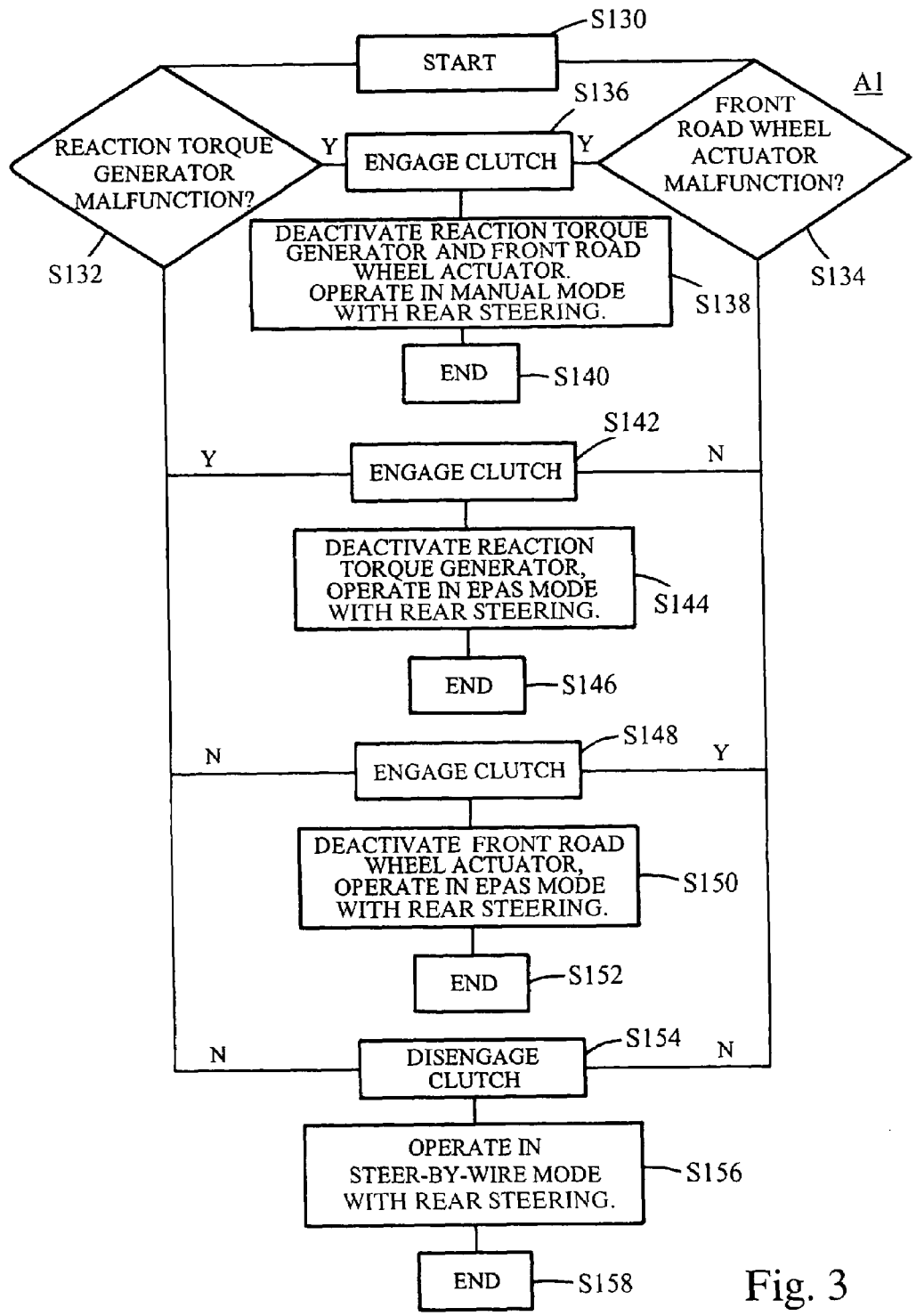
FIG. 3 is a flow chart depicting a sub-matrix control scheme for the A1 sub-matrix.

FIG. 3 is a flowchart summarizing the control algorithm executed in submatrix A1, starting with step S130. The controller 16 inquires as to the functional capacity of the reaction torque generator in step S132 and the front road wheel actuator in step S134. If, as in step S136, there is a malfunction of both the reaction torque generator 26 and the front road wheel actuator 38, the clutch mechanism 50 is engaged. In step S138, the controller 16 deactivates the FRWAS 14 and the DIS 12 and operates the steering system 10 in a manual mode. Moreover, the rear road wheel actuators 87,88 may continue to receive command signals from controller 16 and move the respective rear road wheel for further assisted steering. The controller 16 then resumes normal monitoring and control functions in step S140.

If, as in step S142, the reaction torque generator 26 malfunctions but the front road wheel actuator 38 is functional, the controller 16 engages the clutch mechanism 50. Because the DIS 12 is not functional, the controller 16 deactivates it and operates the vehicle in an EPAS mode with the front road wheel actuator 38 providing the electronic power assist as shown in step S144. Moreover, the rear road wheel actuators 87,88 may continue to receive command signals from controller 16 and move the respective rear road wheel for further assisted steering. The controller 16 then resumes normal monitoring and control functions in step S146.

If, as in step S148, the reaction torque generator 26 is functional but the front road wheel actuator 38 is not functional, the controller engages the clutch mechanism 50. Because the FRWAS 14 is not functional, the controller 16 deactivates it and operates the vehicle in an EPAS mode with the reaction torque generator 26 providing the electronic power assist as shown in step S150. Moreover, the rear road wheel actuators 87,88 may continue to receive command signals from controller 16 and move the respective rear road wheel for further assisted steering. The controller 16 then resumes normal monitoring and control functions in step S152.

If neither the reaction torque generator 26 nor the front road wheel actuator 38 malfunction, as shown in step S154, then the controller 16 maintains the clutch mechanism 50 in a disengaged state. The steering system 10 is then operated in a steer-by-wire mode as shown in step S156 and the controller 16 resumes normal monitoring and control functions in step S158 including control of the RRWAS 15.

Figure 4:
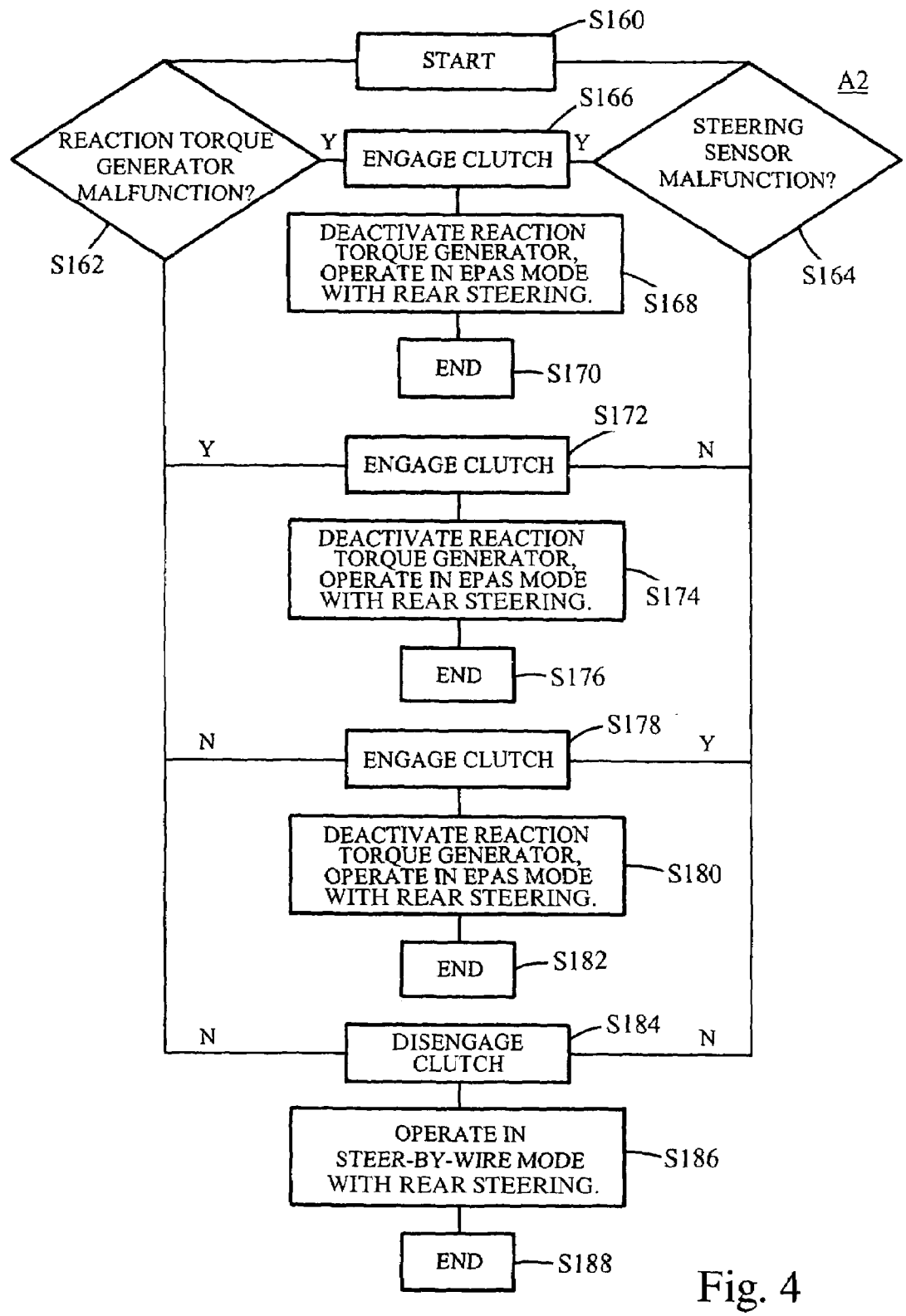
FIG. 4 is a flow chart depicting a sub-matrix control scheme for the A2 sub-matrix.

FIG. 4 is a flowchart summarizing the control algorithm executed in submatrix A2, starting with step S160. The controller 16 inquires as to the functional capacity of the reaction torque generator in step S162 and the steering sensors in step S164. If, as in step S166, there is a malfunction of both the reaction torque generator 26 and one of the various steering sensors, the clutch mechanism 50 is engaged. In step S168, the controller 16 deactivates the DIS 12 and operates the steering system 10 in an EPAS mode with the front road wheel actuator 38 providing the electronic power assist. The rear road wheel actuators 87,88 may continue to receive command signals from controller 16 and move the respective rear road wheel for further assisted steering. The controller 16 then resumes normal monitoring and control functions in step S170.

If, as in step S172, the reaction torque generator 26 malfunctions but the steering sensors are functional, the controller 16 engages the clutch mechanism 50. Because the DIS 12 is not functional, the controller 16 deactivates it and operates the vehicle in an EPAS mode with the front road wheel actuator 38 providing the electronic power assist as shown in step S174. Moreover, the rear road wheel actuators 87,88 may continue to receive command signals from controller 16 and move the respective rear road wheel for further assisted steering. The controller 16 then resumes normal monitoring and control functions in step S176.

If, as in step S178, the reaction torque generator 26 is functional but the steering sensors are not functional, the controller engages the clutch mechanism 50. Because the DIS 12 is not functional, the controller 16 deactivates it and operates the vehicle in an EPAS mode with the front road wheel actuator 38 providing the electronic power assist as shown in step S180. The RRWAS 15 may continue to be controlled by the controller 16. The controller 16 then resumes normal monitoring and control functions in step S182.

If neither the reaction torque generator 26 nor the steering sensors malfunction, as shown in step S184, then the controller 16 maintains the clutch mechanism 50 in a disengaged state. The steering system 10 is then operated in a steer-by-wire mode as shown in step S186 and the controller 16 resumes normal monitoring and control functions in step S188 along with continued control of the RRWAS 15.

Figure 5:
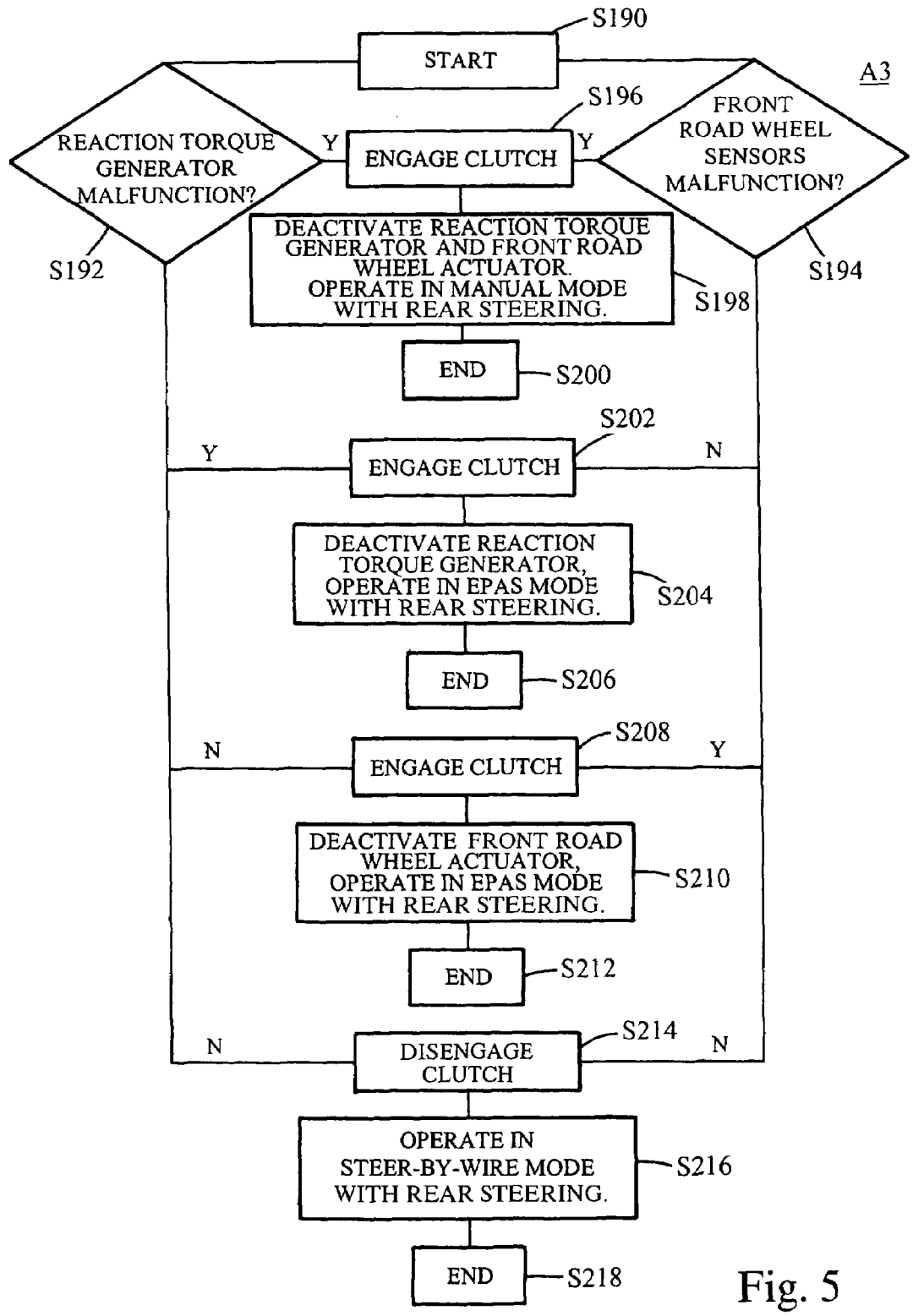
FIG. 5 is a flow chart depicting a sub-matrix control scheme for the A3 sub-matrix.

FIG. 5 is a flowchart summarizing the control algorithm executed in submatrix A3, starting with step S190. The controller 16 inquires as to the functional capacity of the reaction torque generator in step S192 and the front road wheel sensors in step S194. If, as in step S196, there is a malfunction of both the reaction torque generator 26 and the front road wheel sensors, the clutch mechanism 50 is engaged. In step S198, the controller 16 deactivates the FRWAS 14 and the DIS 12 and operates the steering system 10 in a manual mode. Moreover, the rear road wheel actuators 87,88 may continue to receive command signals from controller 16 and move the respective rear road wheel for further assisted steering, so long as the controller 16 is operational. The controller 16 then resumes normal monitoring and control functions in step S200.

If, as in step S202, the reaction torque generator 26 malfunctions but the front road wheel sensors are functional, the controller 16 engages the clutch mechanism 50. Because the DIS 12 is not functional, the controller 16 deactivates it and operates the vehicle in an EPAS mode with the front road wheel actuator 38 providing the electronic power assist as shown in step S204. The rear road wheel actuators 87,88 may continue to receive command signals from controller 16 and move the respective rear road wheel for further assisted steering. The controller 16 then resumes normal monitoring and control functions in step S206.

If, as in step S208, the reaction torque generator 26 is functional but the front road wheel sensors are not functional, the controller engages the clutch mechanism 50. Because the FRWAS 14 is not functional, the controller 16 deactivates it and operates the vehicle in an EPAS mode with the reaction torque generator 26 providing the electronic power assist as shown in step S210. Moreover, the rear road wheel actuators 87,88 may continue to receive command signals from controller 16 and move the respective rear road wheel for further assisted steering. The controller 16 then resumes normal monitoring and control functions in step S212.

If neither the reaction torque generator 26 nor the front road wheel sensors malfunction, as shown in step S214, then the controller 16 maintains the clutch mechanism 50 in a disengaged state. The steering system 10 is then operated in a steer-by-wire mode as shown in step S216 and the controller 16 resumes normal monitoring and control functions in step S218 along with continued control of the RRWAS 15.

Figure 6:
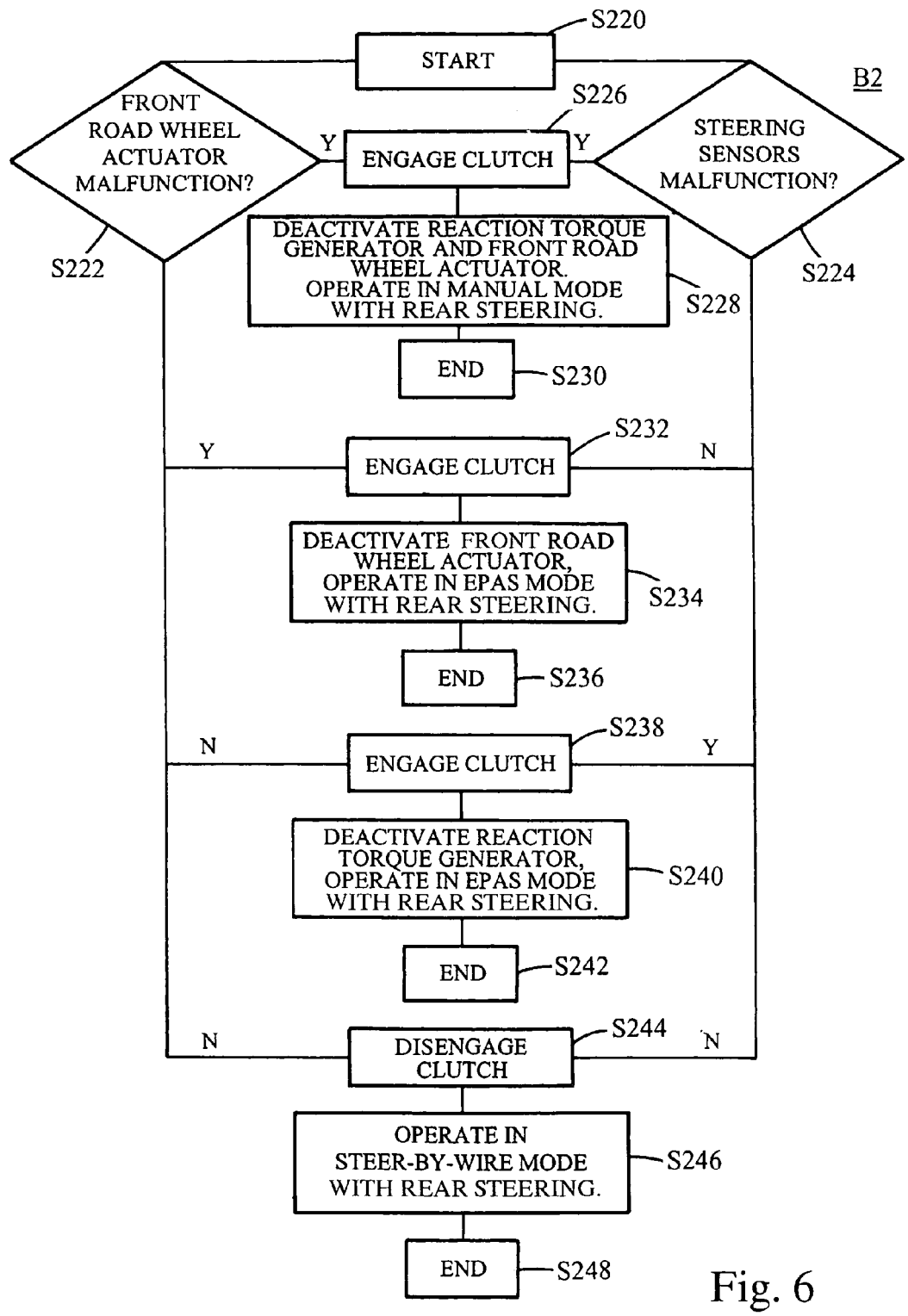
FIG. 6 is a flow chart depicting a sub-matrix control scheme for the B2 sub-matrix.

FIG. 6 is a flowchart summarizing the control algorithm executed in submatrix B2, starting with step S220. The controller 16 inquires as to the functional capacity of the front road wheel actuator 38 in step S222 and the steering sensors in step S224. If, as in step S226, there is a malfunction of both the front road wheel actuator 38 and the steering sensors, the clutch mechanism 50 is engaged. In step S228, the controller 16 deactivates the FRWAS 14 and the DIS 12 and operates the steering system 10 in a manual mode with rear steering control. Moreover, the rear road wheel actuators 87,88 may continue to receive command signals from controller 16 and move the respective rear road wheel for further assisted steering. The controller 16 then resumes normal monitoring and control functions in step S230.

If, as in step S232, the front road wheel actuator 38 malfunctions but the steering sensors are functional, the controller 16 engages the clutch mechanism 50. Because the FRWAS 14 is not functional, the controller 16 deactivates it and operates the vehicle in an EPAS mode with the reaction torque generator 26 providing the electronic power assist as shown in step S234. As above, the rear road wheel actuators 87,88 may continue to receive command signals from controller 16 and move the respective rear road wheel for further assisted steering, so long as the controller 16 is operational. The controller 16 then resumes normal monitoring and control functions in step S236.

If, as in step S238, the front road wheel actuator 38 is functional but the steering sensors are not functional, the controller engages the clutch mechanism 50. Because the DIS 14 is not functional, the controller 16 deactivates it and operates the vehicle in an EPAS mode with the front road wheel actuator 38 providing the electronic power assist as shown in step S240. Moreover, the rear road wheel actuators 87,88 may continue to receive command signals from controller 16 and move the respective rear road wheel for further assisted steering. The controller 16 then resumes normal monitoring and control functions in step S242.

If neither the front road wheel actuator 38 nor the steering sensors malfunction, as shown in step S244, then the controller 16 maintains the clutch mechanism 50 in a disengaged state. The steering system 10 is then operated in a steer-by-wire mode as shown in step S246 and the controller 16 resumes normal monitoring and control functions in step S248 along with continued control of RRWAS 15.

Figure 7:
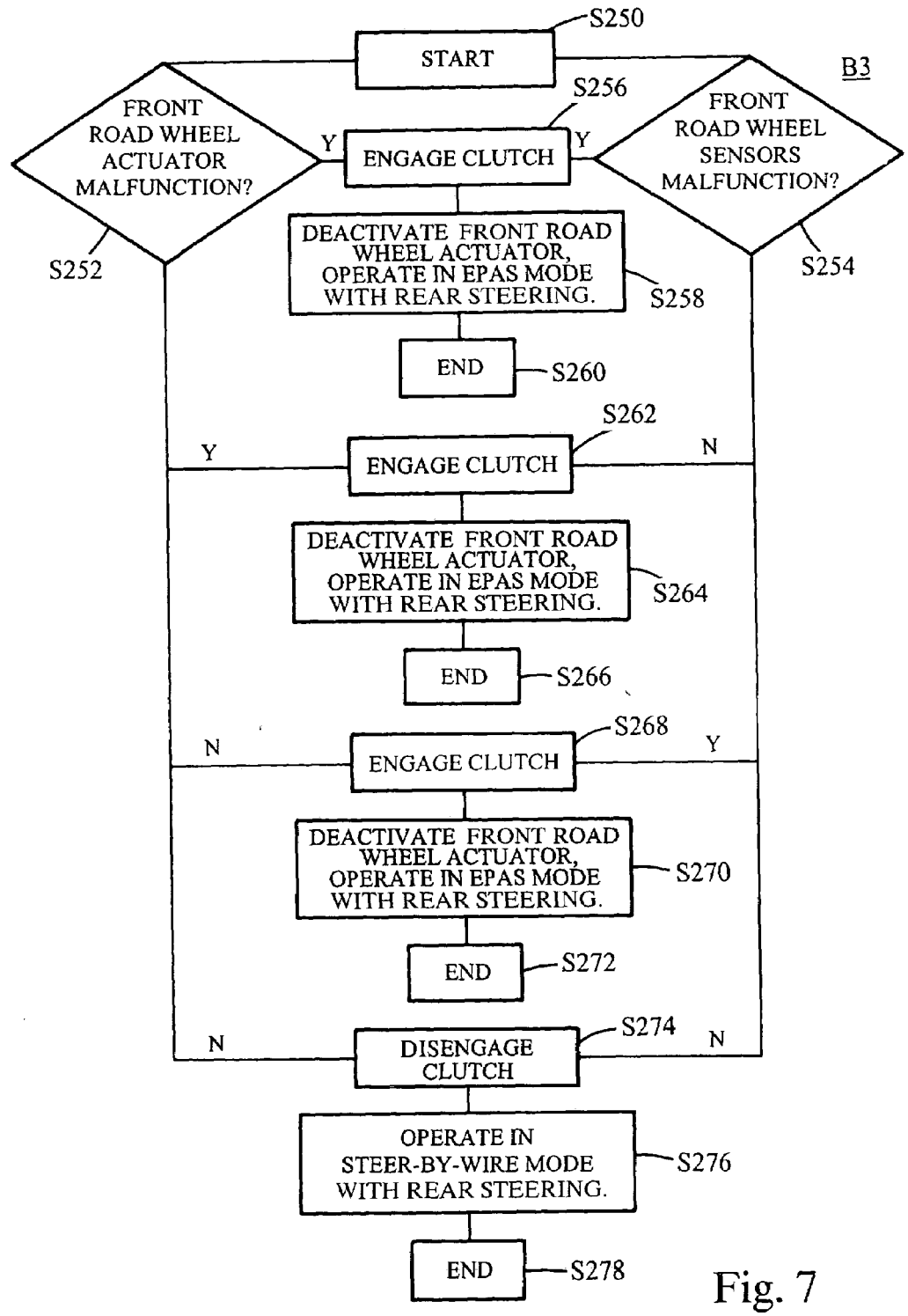
FIG. 7 is a flow chart depicting a sub-matrix control scheme for the B3 sub-matrix.

FIG. 7 is a flowchart summarizing the control algorithm executed in submatrix B3, starting with step S250. The controller 16 inquires as to the functional capacity of the front road wheel actuator 38 in step S252 and the front road wheel sensors in step S254. If, as in step S256, there is a malfunction of both the front road wheel actuator 38 and one of the various front road wheel sensors, the clutch mechanism 50 is engaged. In step S258, the controller 16 deactivates the FRWAS 14 and operates the steering system 10 in an EPAS mode with the reaction torque generator 26 providing the electronic power assist. Moreover, the rear road wheel actuators 87,88 may continue to receive command signals from controller 16 and move the respective rear road wheel for further assisted steering. The controller 16 then resumes normal monitoring and control functions in step S260.

If, as in step S262, the front road wheel actuator 38 malfunctions but the front road wheel sensors are functional, the controller 16 engages the clutch mechanism 50. Because the FRWAS 14 is not functional, the controller 16 deactivates it and operates the steering system 10 in an EPAS mode with the reaction torque generator 26 providing the electronic power assist as shown in step S264. As mentioned above, the rear road wheel actuators 87,88 may continue to receive command signals from controller 16 and move the respective rear road wheel for further assisted steering. The controller 16 then resumes normal monitoring and control functions in step S266.

If, as in step S268, the front road wheel actuator 38 is functional but the front road wheel sensors are not functional, the controller engages the clutch mechanism 50. Because the FRWAS 14 is not functional, the controller 16 deactivates it and operates the vehicle in an EPAS mode with the reaction torque generator 26 providing the electronic power assist as shown in step S270. Moreover, the rear road wheel actuators 87,88 may continue to receive command signals from controller 16 and move the respective rear road wheel for further assisted steering. The controller 16 then resumes normal monitoring and control functions in step S272.

If neither the front road wheel actuator 38 nor the front road wheel sensors malfunction, as shown in step S274, then the controller 16 maintains the clutch mechanism 50 in a disengaged state. The steering system 10 is then operated in a steer-by-wire mode as shown in step S276 and the controller 16 resumes normal monitoring and control functions in step S278 along with rear wheel steering.

Figure 8:
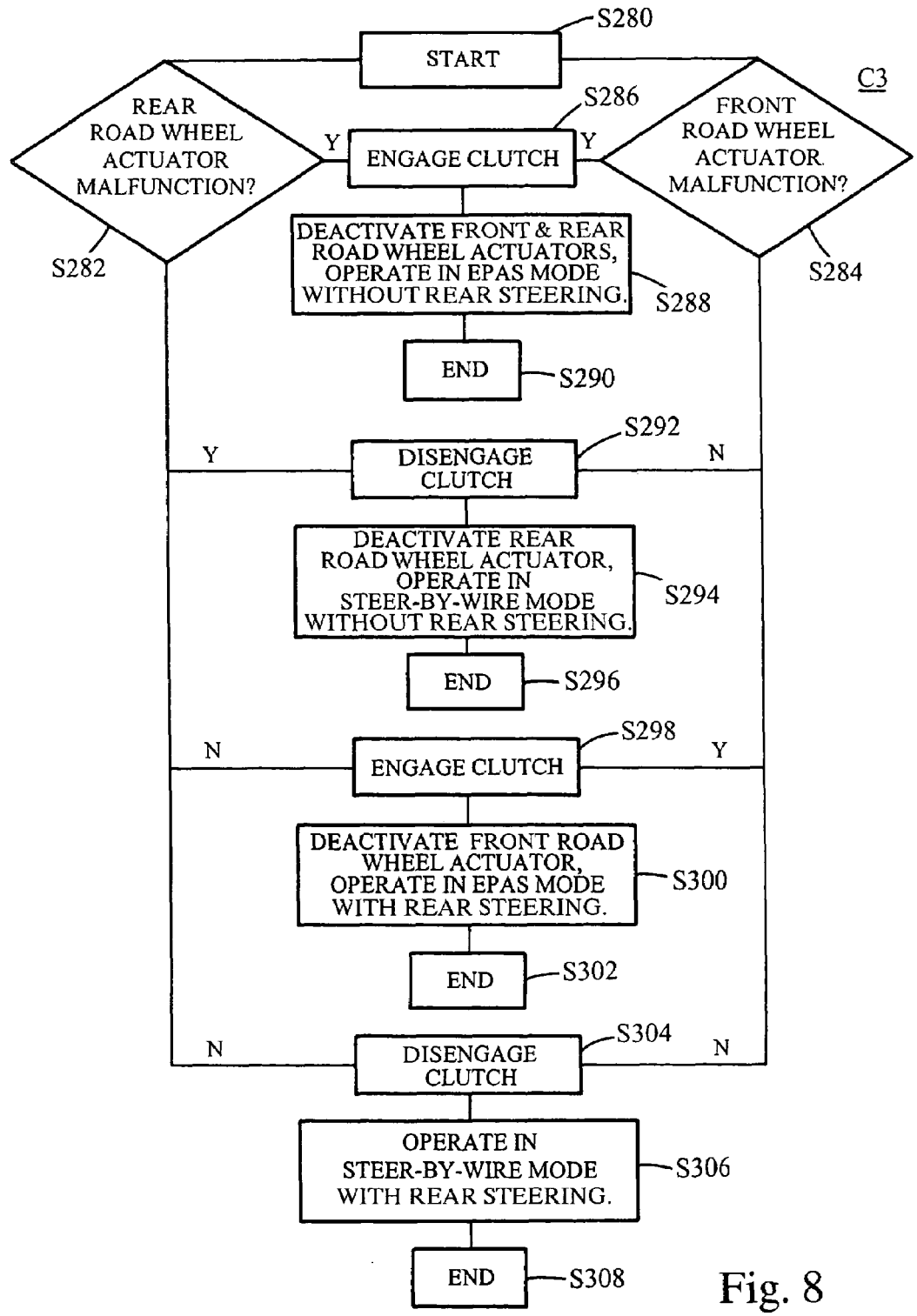
FIG. 8 is a flow chart depicting a sub-matrix control scheme for the C1 sub-matrix.

FIG. 8 is a flowchart summarizing the control algorithm executed in submatrix C1, starting with step S280. The controller 16 inquires as to the functional capacity of the rear road wheel actuators 87, 88 in step S282 and the front road wheel actuator 38 in step S284. If, as in step S286, there is a malfunction of both the rear road wheel actuators and the front road wheel actuator, the clutch mechanism 50 is engaged. In step S288, the controller 16 deactivates the FRWAS 14 and the RRWAS 15 and operates the steering system 10 in an EPAS mode, without rear steering, with the reaction torque generator 26 providing the electronic power assist. The controller 16 then resumes normal monitoring and control functions in step S290.

If, as in step S292, the rear road wheel actuators 87, 88 malfunction but the front road wheel actuator 38 is functional, the controller 16 maintains the clutch mechanism 50 in a disengaged state. Because the RRWAS 15 is not functional, the controller 16 deactivates it and operates the vehicle in a steer-by-wire mode without rear steering control as shown in step S294. The controller 16 then resumes normal monitoring and control functions in step S296.

If, as in step S298, the rear road wheel actuators 87, 88 are functional but the front road wheel actuator 38 is not functional, the controller engages the clutch mechanism 50. Because the FRWAS 14 is not functional, the controller 16 deactivates it and operates the vehicle in an EPAS mode with the reaction torque generator 26 providing the electronic power assist as shown in step S300. Moreover, the rear road wheel actuators 87,88 may continue to receive command signals from controller 16 and move the respective rear road wheel for further assisted steering. The controller 16 then resumes normal monitoring and control functions in step S302.

If neither the rear road wheel actuators 87, 88 nor the front road wheel actuator 38 malfunction, as shown in step S304, then the controller 16 maintains the clutch mechanism 50 in a disengaged state. The steering system 10 is then operated in a steer-by-wire mode as shown in step S306 and the controller 16 resumes normal monitoring and control functions in step S308 including control of the RRWAS 15.

Figure 9:
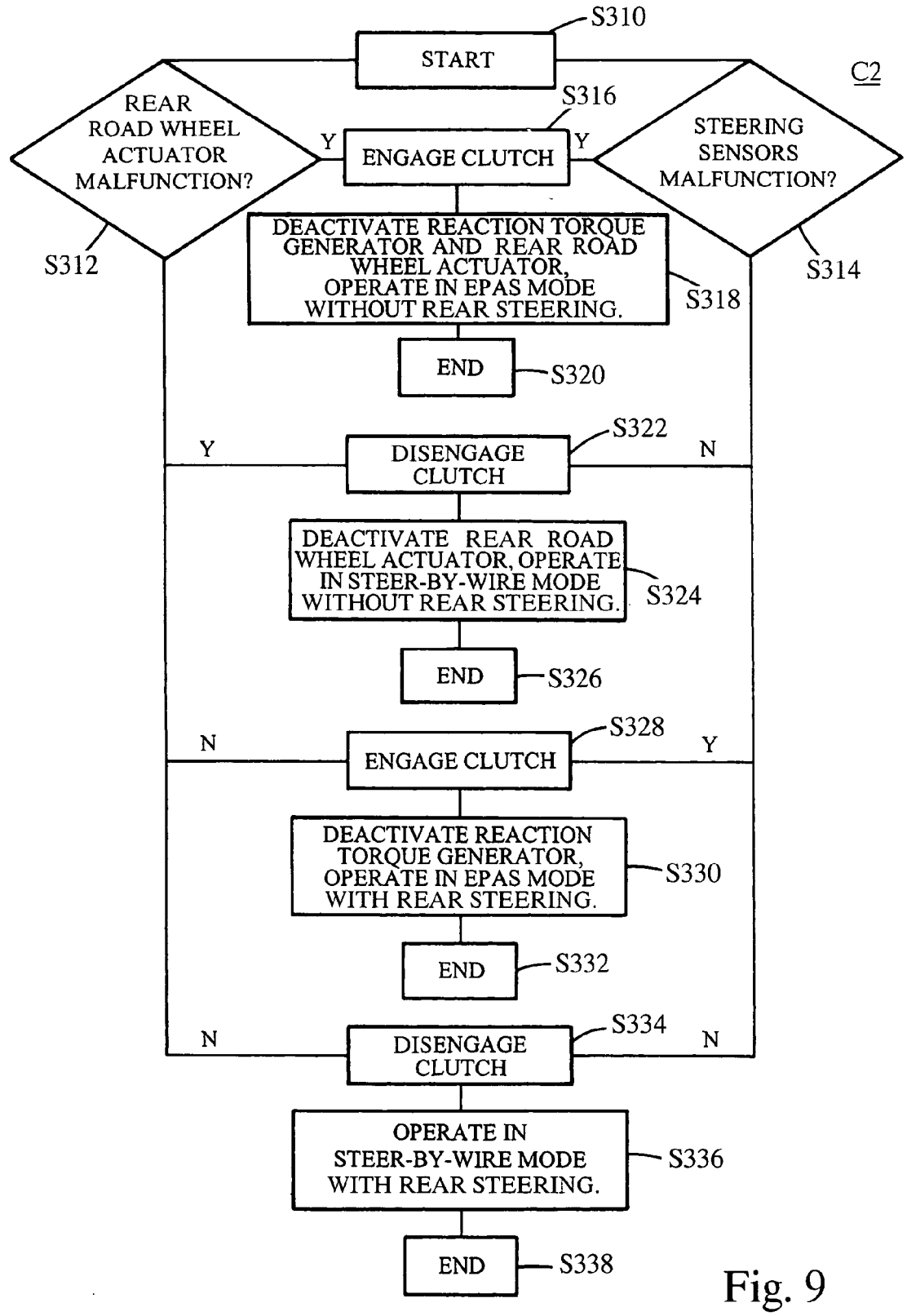
FIG. 9 is a flow chart depicting a sub-matrix control scheme for the C2 sub-matrix.

FIG. 9 is a flowchart summarizing the control algorithm executed in submatrix C2, starting with step S310. The controller 16 inquires as to the functional capacity of the rear road wheel actuators 87, 88 in step S312 and the steering sensors in step S314. If, as in step S316, there is a malfunction of both the rear road wheel actuators and one of the various steering sensors, the clutch mechanism 50 is engaged. In step S318, the controller 16 deactivates the DIS 12 and RRWAS 15 and operates the steering system 10 in an EPAS mode without rear steering, with the front road wheel actuator 38 providing the electronic power assist. The controller 16 then resumes normal monitoring and control functions in step S320.

If, as in step S322, the rear road wheel actuators 87, 88 malfunction but the steering sensors are functional, the controller 16 maintains the clutch mechanism 50 in a disengaged state. Because the RRWAS 15 is not functional, the controller 16 deactivates it and operates the vehicle in a steer-by-wire mode without rear steering as shown in step S324. The controller 16 then resumes normal monitoring and control functions in step S326.

If, as in step S328, the rear road wheel actuators 87, 88 are functional but the steering sensors are not functional, the controller engages the clutch mechanism 50. Because the DIS 12 is not functional, the controller 16 deactivates it and operates the vehicle in an EPAS mode with the front road wheel actuator 38 providing the electronic power assist as shown in step S330. The RRWAS 15 may continue to be controlled by the controller 16. The controller 16 then resumes normal monitoring and control functions in step S332.

If neither the rear road wheel actuators nor the steering sensors malfunction, as shown in step S334, then the controller 16 maintains the clutch mechanism 50 in a disengaged state. The steering system 10 is then operated in a steer-by-wire mode as shown in step S336 and the controller 16 resumes normal monitoring and control functions in step S338 along with continued control of the RRWAS 15.

Figure 10:
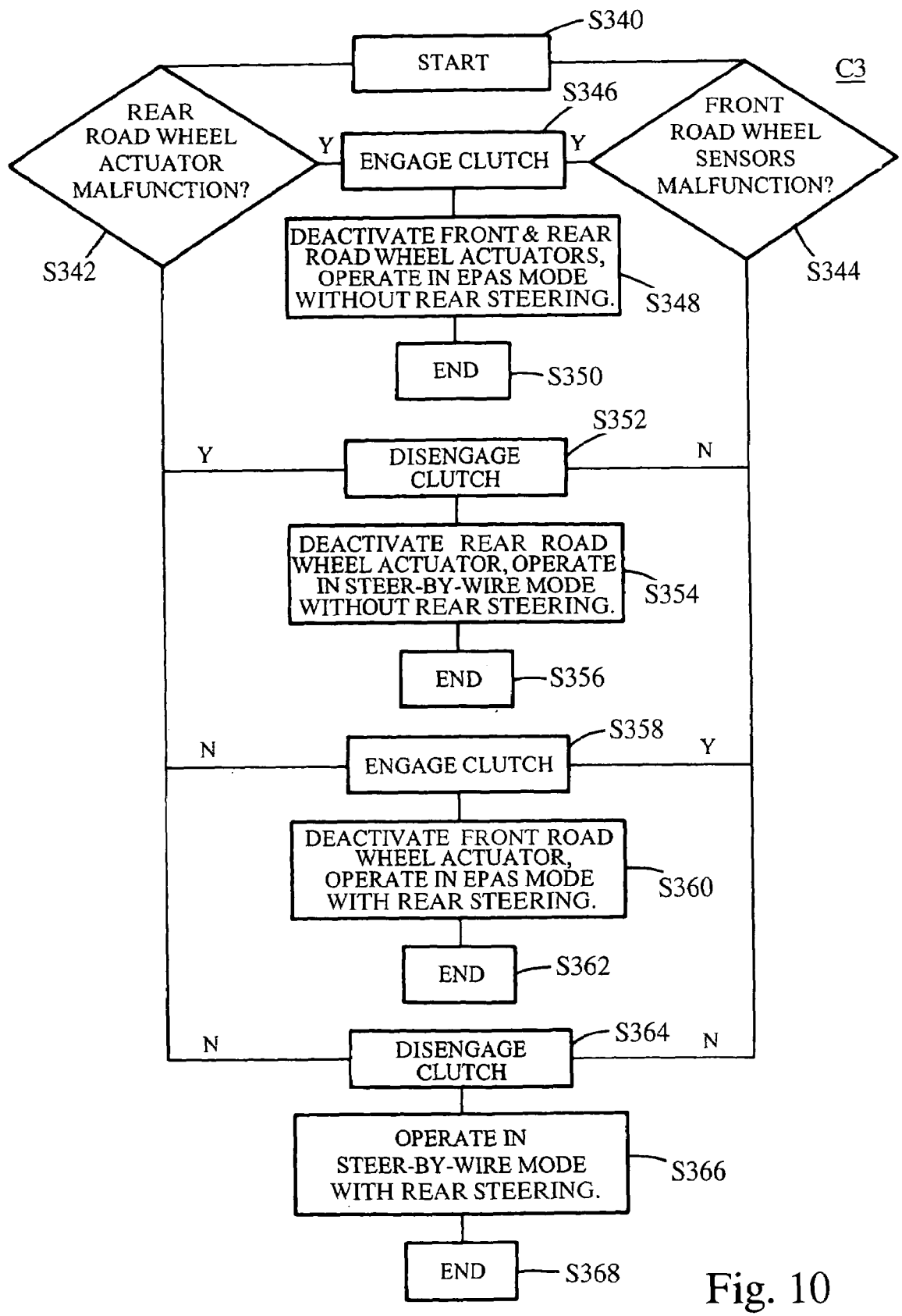
FIG. 10 is a flow chart depicting a sub-matrix control scheme for the C3 sub-matrix.

FIG. 10 is a flowchart summarizing the control algorithm executed in submatrix C3, starting with step S340. The controller 16 inquires as to the functional capacity of the rear road wheel actuators 87, 88 in step S342 and the front road wheel sensors in step S344. If, as in step S346, there is a malfunction of both the rear road wheel actuators and the front road wheel sensors, the clutch mechanism 50 is engaged. In step S348, the controller 16 deactivates the FRWAS 14 and the RRWAS 15 and operates the steering system 10 in a manual mode without rear steering control. The controller 16 then resumes normal monitoring and control functions in step S350.

If, as in step S352, the rear road wheel actuators malfunction but the front road wheel sensors are functional, the controller 16 maintains the clutch mechanism 50 in a disengaged state. Because the RRWAS 15 is not functional, the controller 16 deactivates it and operates the vehicle in a steer-by-wire without rear steering control as shown in step S354. The controller 16 then resumes normal monitoring and control functions in step S356.

If, as in step S358, the rear road wheel actuators are functional but the front road wheel sensors are not functional, the controller engages the clutch mechanism 50. Because the FRWAS 14 is not functional, the controller 16 deactivates it and operates the vehicle in an EPAS mode with rear steering, with the reaction torque generator 26 providing the electronic power assist as shown in step S360. The rear road wheel actuators 87,88 may continue to receive command signals from controller 16 and move the respective rear road wheel for further assisted steering. The controller 16 then resumes normal monitoring and control functions in step S362.

If neither the rear road wheel actuators nor the front road wheel sensors malfunction, as shown in step S364, then the controller 16 maintains the clutch mechanism 50 in a disengaged state while the RRWAS 15 continues to move the rear road wheels 48 accordingly. The steering system 10 is then operated in a steer-by-wire mode as shown in step S366 and the controller 16 resumes normal monitoring and control functions in step S368 with rear wheel steering.

The present invention as described in its preferred embodiment thus provides a steering system capable of operation in one of six modes: steer-by-wire with rear steering, steer-by-wire without rear steering, electronic power assist steering (EPAS) with rear steering, electronic power steering (EPAS) without rear steering, front steering mechanical backup (manual steering) with rear steering, and front steering mechanical backup without rear steering. The control of each steering mode and the transition between the respective steering modes is determined according to the various control schemes presented herein. It should be apparent to those skilled in the art that the above-described embodiment is merely illustrative of but a few of the many possible specific embodiments of the present invention. Numerous and various other arrangements can be readily devised by those skilled in the art without departing from the spirit and scope of the invention as defined in the following claims.

What is claimed is:

1. A motor vehicle steering system selectively operable in a steer-by-wire mode with rear steering, steer-by-wire mode without rear steering, electronic power assist steering (EPAS) mode with rear steering, electronic power steering (EPAS) without rear steering, mechanical backup manual mode with rear steering, and mechanical backup manual mode without rear steering, the steering system comprising:

a front road wheel actuator system including a front road wheel actuator adapted for directing an at least one front road wheel in accordance with a front steering value;

a rear road wheel actuator system including an independent rear road wheel actuator adapted for directing an at least one rear road wheel in accordance with a rear steering value;

a driver interface system including a reaction torque generator, the driver interface system coupled to the front road wheel actuator system, the driver interface system adapted to determine the steering value, and further adapted to communicate the steering value to the front and rear road wheel actuator systems;

a clutch mechanism selectively coupling the driver interface system and the front road wheel actuator system; and a controller adapted to determine one of the steer-by-wire mode with rear steering, steer-by-wire mode without rear steering, electronic power assist steering (EPAS) mode with rear steering, electronic power steering (EPAS) without rear steering, mechanical backup manual mode with rear steering, or mechanical backup manual mode without rear steering, the controller coupled to the front and rear road wheel actuator systems, the driver interface system, and the clutch mechanism, wherein in the steer-by-wire mode with rear steering the controller maintains the clutch mechanism in a disengaged state and the controller operates the driver interface system and the front and rear road wheel actuator system such that the motor vehicle is electronically steerable; and in the steer-by-wire mode without rear steering the controller maintains the clutch mechanism in a disengaged state and the controller operates the driver interface system and the front road wheel actuator system such that the motor vehicle is electronically steerable; and in the EPAS mode with rear steering the controller causes the clutch mechanism to engage and selectively causes one of the road wheel actuator system or the driver interface system to provide electronic power assist steering while controlling the rear steering; and in the EPAS mode without rear steering the controller causes the clutch mechanism to engage and selectively causes one of the road wheel actuator system or the driver interface system to provide electronic power assist steering while deactivating the rear steering; and in the backup mode with rear steering, the controller causes the clutch mechanism to engage such that the motor vehicle is mechanically steerable while controlling the rear steering; and in the manual backup mode without rear steering, the controller causes the clutch mechanism to engage such that the motor vehicle is mechanically steerable while deactivating the rear steering.

2. The steering system of claim 1 wherein the driver interface system includes at least one angular position sensor to determine an angular position of a steerable member, a reaction torque generator current sensor, and a reaction torque generator temperature sensor.

3. The steering system of claim 1 wherein the front road wheel actuator system further comprises at least one front road wheel position sensor, a front road wheel actuator current sensor, a front road wheel actuator temperature sensor, and a rack load sensor.

4. The steering system of claim 1 wherein the rear road wheel actuator system further comprises left and right rear road wheel position sensor, left and right rear road wheel actuator current sensor, and left and right rear road wheel actuator temperature sensor.

5. The steering system of claim 1 wherein the controller is further adapted to receive a set input signals indicative of at least a vehicle speed value, a lateral acceleration value, a yaw rate value, and an ignition mode.

6. The steering system of claim 1 wherein in the EPAS mode with rear steering, the controller controls one of the reaction torque generator or the front road wheel actuator to generate an assistive torque on the steerable member, and further wherein the controller controls the rear road wheel actuator to provide rear steering assist.

7. The steering system of claim 1 wherein in the EPAS mode without rear steering, the controller controls one of the reaction torque generator or the front road wheel actuator to generate an assistive torque on the steerable member, and further wherein the controller deactivates the rear road wheel actuator.

8. The steering system of claim 1 wherein in response to a driver interface system malfunction, the controller deactivates the reaction torque generator, and further wherein the controller controls the front road wheel actuator to provide electronic steering power assist and further wherein the controller controls the rear road wheel actuator to provide rear steering assist.

9. The steering system of claim 8 wherein the driver interface system malfunction includes at least one selected from the group of a reaction torque generator malfunction, an angular position sensor malfunction, a reaction torque generator current sensor malfunction, or a reaction torque generator temperature sensor malfunction.

10. The steering system of claim 8 wherein the driver interface system malfunction includes a reaction torque generator malfunction.

11. The steering system of claim 8 wherein the driver interface system malfunction includes an angular position sensor malfunction.

12. The steering system of claim 8 wherein the driver interface system malfunction includes a reaction torque generator current sensor malfunction.

13. The steering system of claim 8 wherein the driver interface system malfunction includes a reaction torque generator temperature sensor malfunction.

14. The steering system of claim 1 wherein in response to a front road wheel actuator system malfunction, the controller deactivates the front road wheel actuator, and further wherein the controller controls the reaction torque generator to provide electronic steering power assist and further wherein the controller controls the rear road wheel actuators to provide rear steering assist.

15. The steering system of claim 14 wherein the front road wheel actuator system malfunction includes at least one selected from the group of a front road wheel actuator malfunction, a front road wheel position sensor malfunction, a front road wheel actuator current sensor malfunction, a front road wheel actuator temperature sensor malfunction, or a rack load sensor malfunction.

16. The steering system of claim 14 wherein the front road wheel actuator system malfunction includes a front road wheel actuator malfunction.

17. The steering system of claim 14 wherein the front road wheel actuator system malfunction includes a front road wheel position sensor malfunction.

18. The steering system of claim 14 wherein the front road wheel actuator system malfunction includes a front road wheel actuator current sensor malfunction.

19. The steering system of claim 14 wherein the front road wheel actuator system malfunction includes a front road wheel actuator temperature sensor malfunction.

20. The steering system of claim 14 wherein the front road wheel actuator system malfunction includes a rack load sensor malfunction.

21. The steering system of claim 1 wherein in response to a rear road wheel actuator system malfunction, the controller deactivates the rear road wheel actuator, and further wherein the controller maintains the control of the steering system in steer-by-wire mode without rear steering.

22. The steering system of claim 21 wherein the rear road wheel actuator system malfunction includes at least one of a rear road wheel actuator malfunction, a rear road wheel position sensor malfunction, a rear road wheel actuator current sensor malfunction, or a rear road wheel actuator temperature sensor malfunction.

23. The steering system of claim 21 wherein the rear road wheel actuator system malfunction includes a rear road wheel actuator malfunction.

24. The steering system of claim 21 wherein the rear road wheel actuator system malfunction includes a rear road wheel position sensor malfunction.

25. The steering system of claim 21 wherein the rear road wheel actuator system malfunction includes a rear road wheel actuator current sensor malfunction.

26. The steering system of claim 21 wherein the rear road wheel actuator system malfunction includes a rear road wheel actuator temperature sensor malfunction.

27. The steering system of claim 1 wherein in response to a driver interface system malfunction and a front road wheel actuator system malfunction, the controller deactivates the reaction torque generator and the front road wheel actuator and further wherein the controller controls the rear road wheel actuators to provide rear steering assist.

28. The steering system of claim 27 wherein in response to a driver interface system malfunction and a front road wheel actuator system malfunction, the controller causes the clutch mechanism to be engaged such that the motor vehicle is manually steerable with rear steering assist.

29. The steering system of claim 1 wherein in response to a driver interface system malfunction and rear road wheel actuator system malfunction, the controller deactivates the reaction torque generator and the rear road wheel actuator and further wherein the controller controls the front road wheel actuators to provide electronic steering assist.

30. The steering system of claim 29 wherein in response to a driver interface system malfunction and rear road wheel actuator system malfunction, the controller causes the clutch mechanism to be engaged such that the motor vehicle is electronically steerable with front steering assist.

31. The steering system of claim 1 wherein in response to a front and rear road wheel actuator system malfunction, the controller deactivates the front and rear road wheel actuators and further wherein the controller controls the reaction torque generator to provide electronic steering assist.

32. The steering system of claim 31 wherein in response to a front and rear road wheel actuator system malfunction, the controller causes the clutch mechanism to be engaged such that the motor vehicle is electronically steerable with reaction torque generator steering assist.

33. The steering system of claim 1 wherein in response to a driver interface system malfunction, and front and rear road wheel actuator system malfunction, the controller deactivates the reaction torque generator and front and rear road wheel actuators.

34. The steering system of claim 33 wherein in response to a driver interface system malfunction, and front and rear road wheel actuator system malfunction, the controller causes the clutch mechanism to be engaged such that the motor vehicle is manually steerable.

35. The steering system of claim 1 further comprising a battery to provide electrical current to the driver interface system, front road wheel actuator system and the rear road wheel actuator system, and further comprising a battery current sensor coupled to the controller, the battery current sensor sensitive to fluctuations in battery current.

36. The steering system of claim 35 wherein in response to a threshold battery current value, the controller deactivates the reaction torque generator, the front road wheel actuator and the rear road wheel actuator, and further wherein the controller causes the clutch mechanism to be engaged such that the motor vehicle is manually steerable.

37. The steering system of claim 35 wherein in response to no electrical current to the driver interface system, front road wheel actuator system and the rear road wheel actuator system, the clutch mechanism is engaged such that the motor vehicle is manually steerable.

38. The steering system of claim 1 wherein the front road wheel actuator is coupled to a pinion, and further wherein the front road wheel actuator is adapted to rotate the pinion such that the pinion causes a rack to move along a transverse axis of the motor vehicle.

39. The steering system of claim 1 wherein the reaction torque generator is coupled to a steerable member, and further wherein the reaction torque generator is adapted to rotate a shaft such that the shaft causes the steerable member to rotate.

40. The steering system of claim 1 wherein the reaction torque generator is further adapted to generate reaction torque in the steer-by-wire mode, and further wherein the reaction torque generator is adapted to generate electronic power assisted steering in the EPAS mode.

* * * * *